United States Patent
Uppalli et al.

(10) Patent No.: US 9,729,426 B2
(45) Date of Patent: Aug. 8, 2017

(54) STITCHING TOGETHER PARTIAL NETWORK TOPOLOGIES

(71) Applicant: Riverbed Technology, Inc., San Francisco, CA (US)

(72) Inventors: Raghavendra B. Uppalli, Cary, NC (US); James Mark Shaw, Cary, NC (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 193 days.

(21) Appl. No.: 14/151,782

(22) Filed: Jan. 9, 2014

(65) Prior Publication Data
US 2014/0201359 A1  Jul. 17, 2014

Related U.S. Application Data

(60) Provisional application No. 61/751,310, filed on Jan. 11, 2013.

(51) Int. Cl.
| | |
|---|---|
| *H04L 12/751* | (2013.01) |
| *H04L 12/717* | (2013.01) |
| *H04L 12/24* | (2006.01) |

(52) U.S. Cl.
CPC ............ *H04L 45/02* (2013.01); *H04L 41/12* (2013.01); *H04L 45/42* (2013.01)

(58) Field of Classification Search
None
See application file for complete search history.

(56) References Cited

U.S. PATENT DOCUMENTS

| | | | | |
|---|---|---|---|---|
| 6,385,201 B1* | 5/2002 | Iwata | ............... | H04L 49/205 370/255 |
| 7,509,405 B2* | 3/2009 | Hubbard | ............. | H04L 29/06 709/223 |
| 7,752,024 B2* | 7/2010 | Ball | ............. | H04L 41/12 703/1 |
| 7,894,369 B2* | 2/2011 | Shaw | ............. | H04L 12/4633 370/254 |
| 7,940,763 B1* | 5/2011 | Kastenholz | ............. | H04L 12/28 370/255 |
| 8,125,927 B2* | 2/2012 | Nandy | ............. | H04L 45/02 370/254 |
| 8,264,988 B2* | 9/2012 | Zhang | ............. | H04L 45/00 370/256 |

(Continued)

*Primary Examiner* — Shirley Zhang
(74) *Attorney, Agent, or Firm* — Park, Vaughan, Fleming & Dowler LLP; Laxman Sahasrabuddhe

(57) ABSTRACT

A method and system that takes advantage of processes that are efficient for determining the topology of small to medium size networks to determine individual network topologies for such networks, and then merges these individual topologies into a consolidated topology for the entire network. Each of the processes that determines the topology of the smaller networks provides the determined network topology, as well as a list of factors that may be relevant in the determination of how the given topology might be attached to any other given topology, such as the identification of a node that is not included in the given topology, or other indications of external connections. The merging process is configured to substantially restrict its analysis to these factors, thereby limiting the extent, and therefore the time consumed, by this stitching and merging process.

21 Claims, 7 Drawing Sheets

(56) References Cited

U.S. PATENT DOCUMENTS

| | | | | |
|---|---|---|---|---|
| 8,670,352 | B2* | 3/2014 | Uppalli | H04L 12/4625 |
| | | | | 370/254 |
| 8,743,736 | B2* | 6/2014 | Uppalli | H04L 41/12 |
| | | | | 370/254 |
| 9,087,299 | B2* | 7/2015 | Uppalli | H04L 41/12 |
| 2003/0145078 | A1* | 7/2003 | Hubbard | H04L 29/06 |
| | | | | 709/224 |
| 2008/0031156 | A1* | 2/2008 | Balasubramaniam | H04L 12/66 |
| | | | | 370/254 |
| 2008/0049645 | A1* | 2/2008 | Singh | H04L 41/0853 |
| | | | | 370/254 |
| 2010/0008257 | A1* | 1/2010 | Uppalli | H04L 41/12 |
| | | | | 370/254 |
| 2010/0061231 | A1* | 3/2010 | Harmatos | H04L 12/5695 |
| | | | | 370/228 |
| 2011/0019674 | A1* | 1/2011 | Iovanna | H04L 45/12 |
| | | | | 370/392 |
| 2012/0087377 | A1* | 4/2012 | Lai | H04L 45/04 |
| | | | | 370/427 |
| 2012/0201168 | A1* | 8/2012 | Singh | H04L 41/0853 |
| | | | | 370/254 |
| 2013/0044761 | A1* | 2/2013 | Koponen | H04L 12/66 |
| | | | | 370/401 |
| 2013/0070638 | A1* | 3/2013 | Iovanna | H04L 45/04 |
| | | | | 370/254 |
| 2014/0226528 | A1* | 8/2014 | Singh | H04L 41/0853 |
| | | | | 370/254 |

* cited by examiner

STITCHING TOGETHER PARTIAL NETWORK TOPOLOGIES

This application claims the benefit of U.S. Provisional Patent Application 61/751,310, filed 11 Jan. 2013.

BACKGROUND AND SUMMARY OF THE INVENTION

This invention relates to the field of network analysis, and in particular to a method and system that receives a set of individual network topologies and forms a composite network topology by determining the connections between the individual network topologies.

A common task in the field of network analysis is to determine the topology of the network that is to be analyzed. If the network is small, a human may create a computer-readable topological model of the network, and provide that model to network analysis tools that require such a model.

If the network is larger, a computer program may be configured to query the devices in the network for information that can be used to deduce or infer the interconnections among these devices. For example, the configuration of the routers in the network, including the current routing table and interface information for each router, may be used to determine the paths that messages will take as they propagate from one device to another device via such routers. In like manner, the configuration information at other devices may be used to further determine the connections among the devices. Some of the data used to infer connectivity include, for example:

IP addressing data, which provides Layer 3 view of the network.

Neighbor discovery data, which provides information about neighbors that are connected to a device, and hence assists in inferring a Layer 2 topology. Example products include Cisco Discovery Protocol, and Link Layer Discovery Protocol.

Forwarding table data, which contains the physical addresses of interfaces that are reachable through another interface. This data may be used in Layer 2 topology inference, although the data is often incomplete and volatile.

BGP neighbor data, which provides border connectivity information with different Autonomous Systems (AS).

Logical tunnel and virtual circuit definitions, which provides logical connectivity data.

Unfortunately, the time required to assess the configuration of each device to determine a possible connection to each of the other devices in the network increases exponentially as the size of the network increases. At some point, the time required to determine the topology of a very large network makes such a determination infeasible, or at least impractical for use in any real-time or near-time analyses, such as analyses used to detect and correct problems within the network.

It would be advantageous to provide a method and system that is able to determine, or estimate, the topology of a very large network without incurring an exponential increase in time for larger and larger networks. It would also be advantageous to provide a method and system that distributes the process of topology determination among a variety of processors, allowing for substantial parallel processing.

These advantages, and others, can be realized by a method and system that takes advantage of processes that are efficient for determining the topology of small to medium size networks to determine individual network topologies for such networks, and then merges these individual topologies into a consolidated topology for the entire network. Each of the processes that determine the topology of the smaller networks provides the determined network topology, as well as a list of factors that may be relevant in the determination of how the given topology might be attached to any other given topology, such as the identification of a node that is not included in the given topology, or other indications of external connections. The merging process is configured to substantially restrict its analysis to these factors, thereby limiting the extent, and therefore the time consumed, by this merging process.

Network topology inference algorithms use large amounts of data collected from network devices. Modern networks are very large with tens of thousands of network devices in them. Management or topology inference on such networks is not very scalable for networks of this size. A typical approach is to logically spread the devices across different management systems, with each system maintaining its associated topology. Such a setup, however, fails to give a consolidated and complete network topology to a network administrator. Hence, network management systems fall short of achieving their full potential in terms of convenience to network administrators.

This invention overcomes this issue by providing a comprehensive network view of a network by stitching topologies based on varying levels of relationships between network devices that are managed by different network management systems.

BRIEF DESCRIPTION OF THE DRAWINGS

The invention is explained in further detail, and by way of example, with reference to the accompanying drawings wherein.

DETAILED DESCRIPTION

Figure 1A:
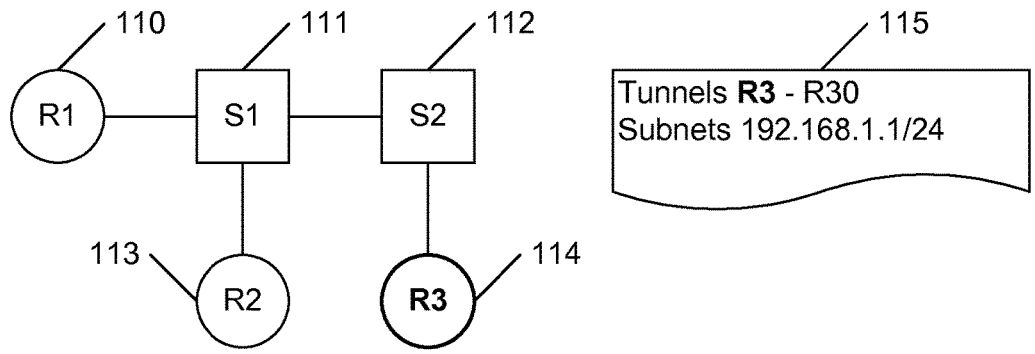
FIGS. 1A-1E illustrate an example set of individual network topologies and corresponding residual information.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Current topology inference tools process information from a complete set of devices that form the network. The algorithms within such tools are computationally intensive and the runtime depends on the number of managed devices. As the number of devices grows larger, it takes significant time and memory to infer the topology by considering data from all the devices, often making the use of such topology inference tools infeasible or impractical. This invention alleviates the need for considering the full set of devices to produce the complete topology by leveraging topologies of smaller subsets of the network produced by different instances of a network management system.

The information used by topology inference tools to determine the topology of an individual network will include information that relates to relationships among the devices within the individual network, as well as relationships, or potential relationships between devices within the individual network and devices that are external to the individual network. However, this internal/external distinction is generally not explicit in the information content.

Relationships among devices may include, for example:
endpoints of a logical tunnel;
devices peering with a common autonomous system (AS);
devices that are neighbors according to a neighbor discovery protocol;
devices that are within the same IP subnet; and
devices that are part of the same Switching domain.

In accordance with an aspect of this invention, the topology inference tools are configured to identify relationships defined by the information content, and to distinguish between relationships that are 'satisfied' within the determined topology, and the relationships that are 'unsatisfied' by the determined topology. After the topology has been determined, the information that identifies unsatisfied relationships can be assumed to be related to one or more external devices or external connections. For example, the information may identify the existence of a tunnel between two nodes. If both of these nodes are contained within the individual network, the relationship defined by this tunnel-identifier information is considered to be 'satisfied'. If, on the other hand, one of the nodes is not within the individual network, the relationship is considered to be 'unsatisfied', and this tunnel-identifier information will be considered to be potentially related to a device or connection that is external to the individual network.

In accordance with an aspect of this invention, each individual network management system is configured to filter the received configuration information to remove any information that is ascertained to be related solely to devices and connections within its individual network. The remaining information is hereinafter termed the 'residual' information that is associated with the topology of the individual network.

One of skill in the art will recognize that the configuration information provided by the devices may contain redundant information and/or that different tools may use different information items to determine connections between devices. In the above distinction between information used to distinguish internal connections and external connections, the information removed to form the residual information is any information that is related only to devices that are discovered to be within the individual network, and the residual information is information that is related to devices and connections, or potential devices and connections, that are not discovered to be within the individual network. For example, the identification of a particular autonomous system (AS) is generally included in the residual information, because it cannot be ascertained whether that autonomous system is wholly contained within the identified network.

In a preferred embodiment, the individual network topologies are 'stitched together' using the residual information that is provided by the individual network management systems. In this manner, none of the information that is ascertained to be solely related to devices and connections within the individual networks needs to be processed by the network-stitching process, thereby avoiding, or substantially reducing, the exponential increase in processing time required to determine the topology of a network as the size of the network increases.

FIGS. 1A-1E illustrate an example set of individual network topologies and corresponding residual information. Each of these topologies may have been inferred by individual network management systems, or by a common network management system that is structured to partition the network into smaller individual networks. For ease of reference and understanding, the term 'individual network management system' includes such a common network management system operating on the data associated with each individual network.

The individual network topologies, for example, may correspond to different geographic regions, different departments within an organization, and so on. In some embodiments, the network may be partitioned along 'artificial' boundaries, based on the capabilities of the network inference tools being used to determine the individual topologies. In some embodiments, some of the individual network topologies may be created manually. Although the example individual networks include only a few devices, one of skill in the art will recognize that a typical individual network may include many more devices, depending upon the capabilities of the network inference tools used to determine the topology of each individual network.

FIG. 1A illustrates a network comprising three devices R1, R2, R3 (110, 113, 114 respectively) that are coupled together via two switches S1, S2 (111, 112). These switches S1, S2 may be, for example, conventional layer 2 switches. The illustrated topology may have been created using any of a variety of network topology tools, such as described in U.S. Pat. No. 8,144,627, "INFERRING CONNECTIVITY IN THE PRESENCE OF CONFLICTING NETWORK DATA", issued 27 Mar. 2012 to Raghavendra B. Uppalli and James Mark Shaw, and incorporated by reference herein. In this referenced invention, configuration information is obtained from devices within the network and provided to a variety of topology inferencing engines, based on the type and source of the information. For example, an IP-based engine may infer that a set of devices are all in the same IP-subnet; a forwarding-table based engine may infer that devices are connected based on the "next hop" information contained in a router's routing table; a neighbor-discovery based engine may infer that neighboring devices are connected; a tunnel based engine may infer that devices are connected based on their being at either end of a defined tunnel, and so on. All of this information is then processed to determine a topology that is consistent with all, or most, of the inferred connections.

In accordance with an aspect of this invention, in addition to providing a topology of the network, the network topology tool may also provide a set of 'residual' information 115. The residual information 115 may be provided by a component within the network topology tool, or as part of a post-process to the network topology tool. For example, a post-processing tool may receive the configuration information that had been provided to the network topology tool, as well as the topology information that the network topology tool determined via an analysis of this configuration information. By examining the parameters of each configuration information item, and comparing it to the determined topology information, the post-process tool can determine whether that configuration information item is related to a device or connection that is not included in the topology information for the given network. If so, that configuration information item is included within the residual information 115 that is provided to the network stitching tool.

As noted above, information that may or may not be solely related to devices that are external to the given network may also be included in the residual data. For example, the configuration of an IP subnet typically includes a range of IP addresses, and the determined topology may not exhaustively identify a device corresponding to each IP address within the range. Due to how the individual network had been partitioned from the overall network, some devices within the same IP subnet may be external to the individual network. Accordingly, the identification of IP subnets, or IP subnets with an address range that is not exhaustively accounted for, may be included within the residual information.

As illustrated in FIG. 1A, the residual information 115 includes the identification of a tunnel between devices R3 and R30. Device R3 114 is included within the determined topology of the network of FIG. 1A, but device R30 is not. Accordingly, this tunnel information is assumed to be related to a device (R30) that is external to the network of FIG. 1A, and included in the residual information 115.

Also illustrated in FIG. 1A is the identification of an IP subnet 192.168.1.1/24. Because, as detailed above, there may be other devices within this subnet that are not within the topology of the network of FIG. 1A, this subnet information is included as information that may be related to one or more devices that are external to the network of FIG. 1A.

Presumably, all of the other configuration information that was used to determine the topology of the network of FIG. 1A has been determined to be related only to the devices and connections that form the topology of the network of FIG. 1A, and not included in the residual information 115.

Figure 1B:
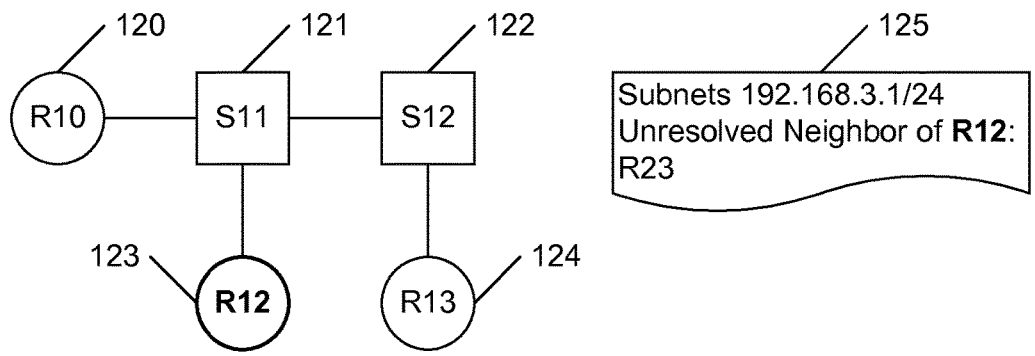

In like manner, the topology of the network of FIG. 1B illustrates three devices R10, R12, and R13 (120, 123, 124 respectively) that are coupled via switches S11, S12 (121, 122). In this example, the identified residual information 125 includes an identification of another IP subnet 192.168.3.1/24, and the identification of a neighbor R23 of R12 that is not included within the determined topology of the network of FIG. 1B.

Figure 1C:
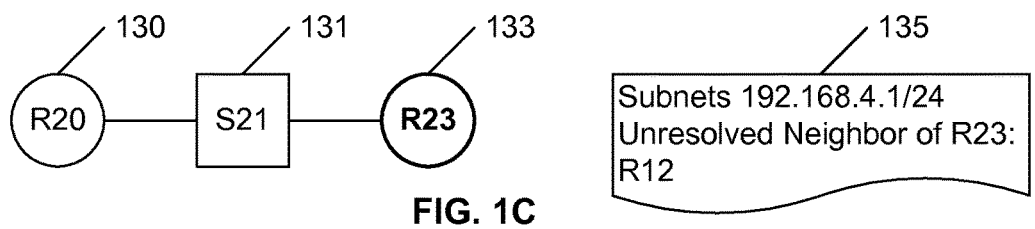

The determined topology of the network of FIG. 1C illustrates two devices, R20 and R23 (130, 133) connected by a switch S21 (131). The determined residual information 135 includes an identification of another subnet, 192.168.4.1/24, as well as the identification of a neighbor R12 of R23 that is not included within the topology of FIG. 1C.

Figure 1D:
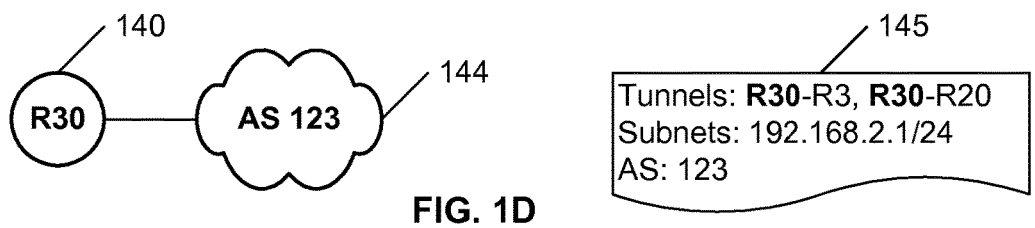

The determined topology of the network of FIG. 1D illustrates a device R30 (140) that is coupled to (part of) autonomous system AS123 (144). The residual information 145 includes the identification of two tunnels, a tunnel between R30 and R3, and a tunnel between R30 and R20. Neither R3 nor R20 are within the network of FIG. 1D. The residual information includes another IP subnet 192.168.2.1/24, as well as the existence of autonomous system AS123.

As with the above discussion of IP subnets, the existence of AS123 in the network of FIG. 1D does not exclude other devices that may be external to the network of FIG. 1D from being included within this same autonomous system AS123, and thus AS123 is included in the residual information 145.

Figure 1E:
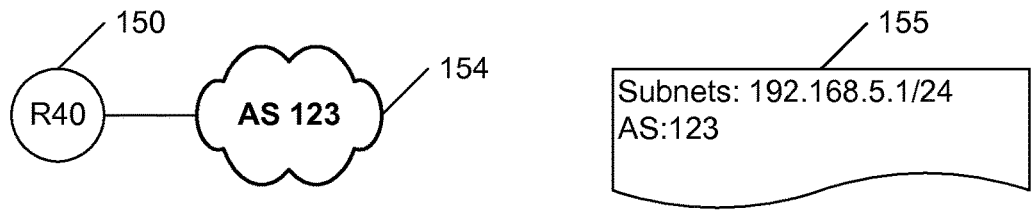

The determined topology of the network of FIG. 1E illustrates a device R40 (150) that is couple to (part of) autonomous system AS123 (154). Note that a different reference numeral (154) is used to identify the element AS123 in FIG. 1E than the reference numeral (144) used to reference the element AS123 in FIG. 1D. This is to clearly illustrate that, at this stage of the topology determination, neither of the topology inference tools that provided the topologies of FIGS. 1D and 1E are aware that the same element AS123 is identified by the other tool.

The residual information of FIG. 1E includes the identification of another subnet 192.168.5.1/24, and the identification of the autonomous system AS123.

In accordance with an aspect of this invention, a network stitching tool is structured to determine connections among a plurality of individual networks based on the residual information that is provided with respect to these individual networks, the residual information being information that is not solely related to, or not known to be solely related to, devices and connections that are within each individual network.

Figure 4A:
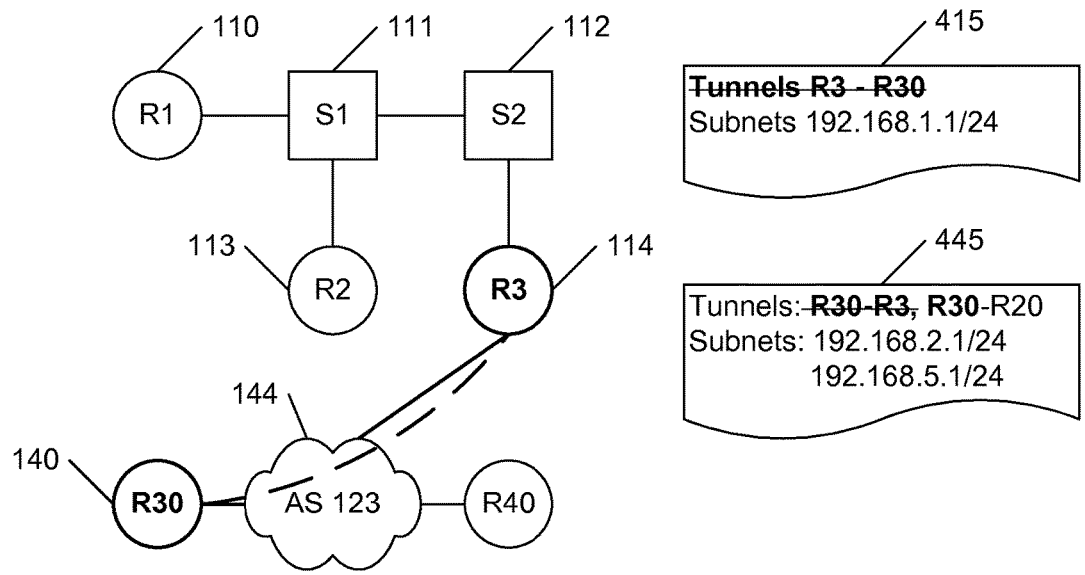
FIGS. 4A-4B illustrate the example set of FIGS. 3A-3C after inferring a first tunnel.
Figure 4B:
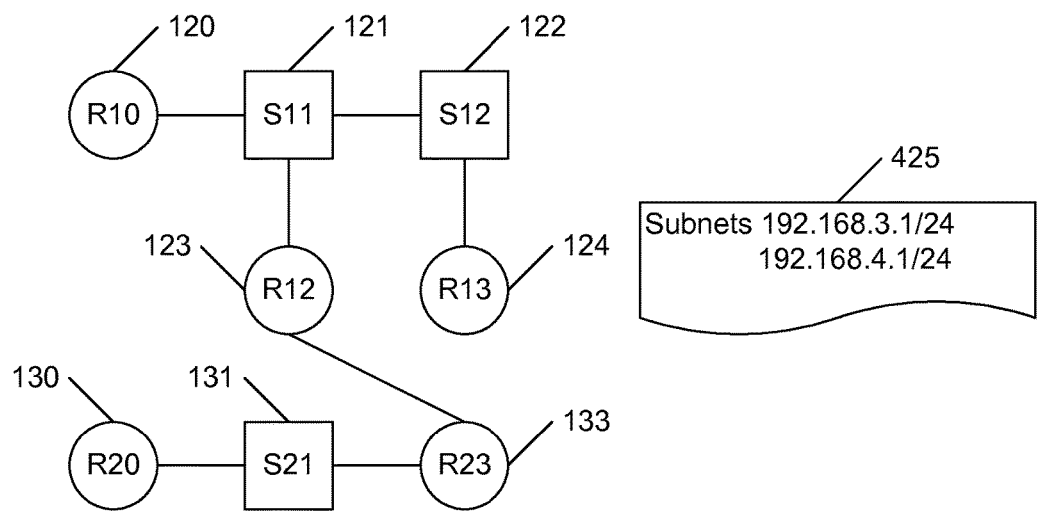
Figure 5:
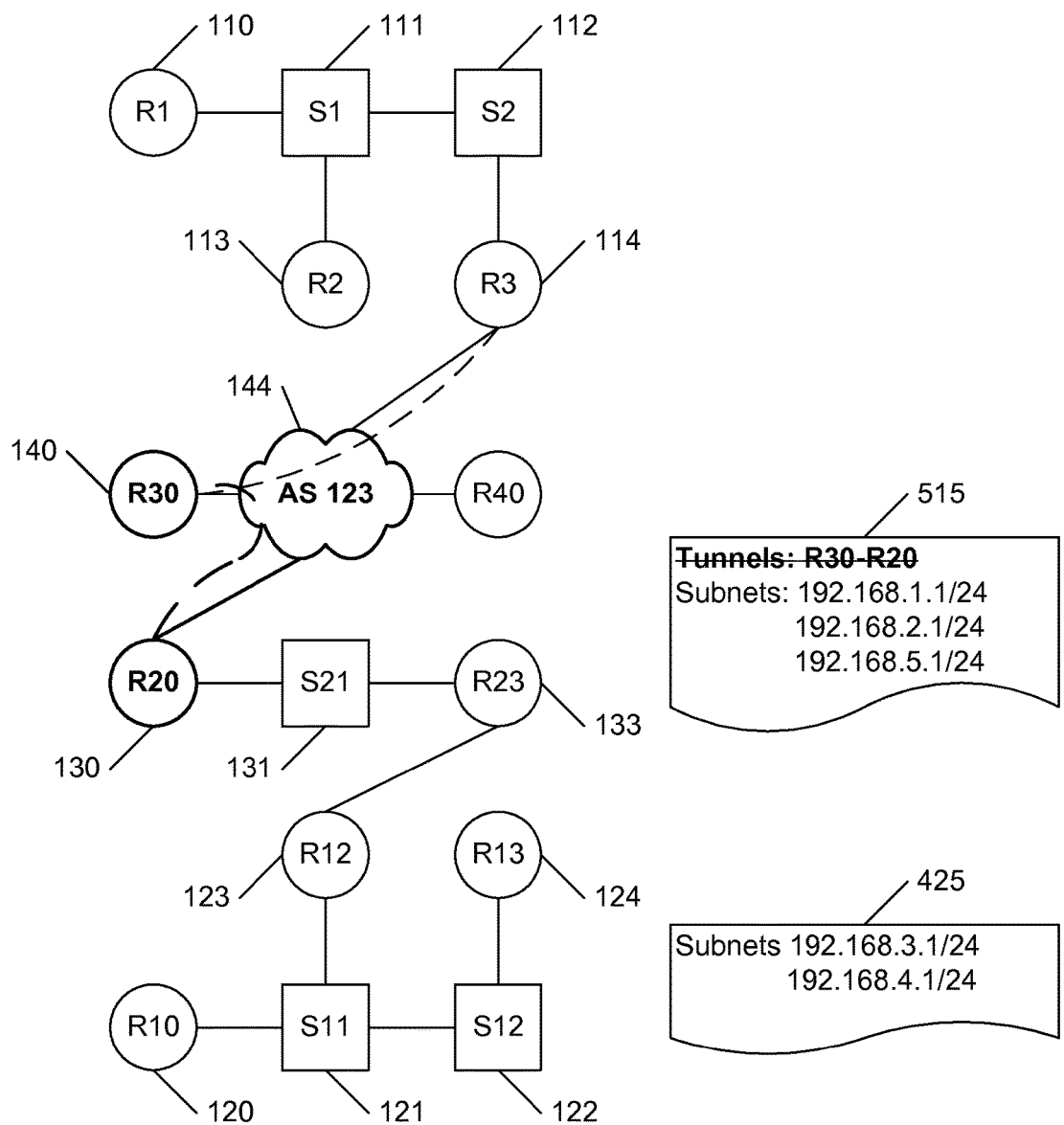
FIG. 5 illustrates the example set of FIGS. 4A-4B after inferring a second tunnel.
Figure 6:
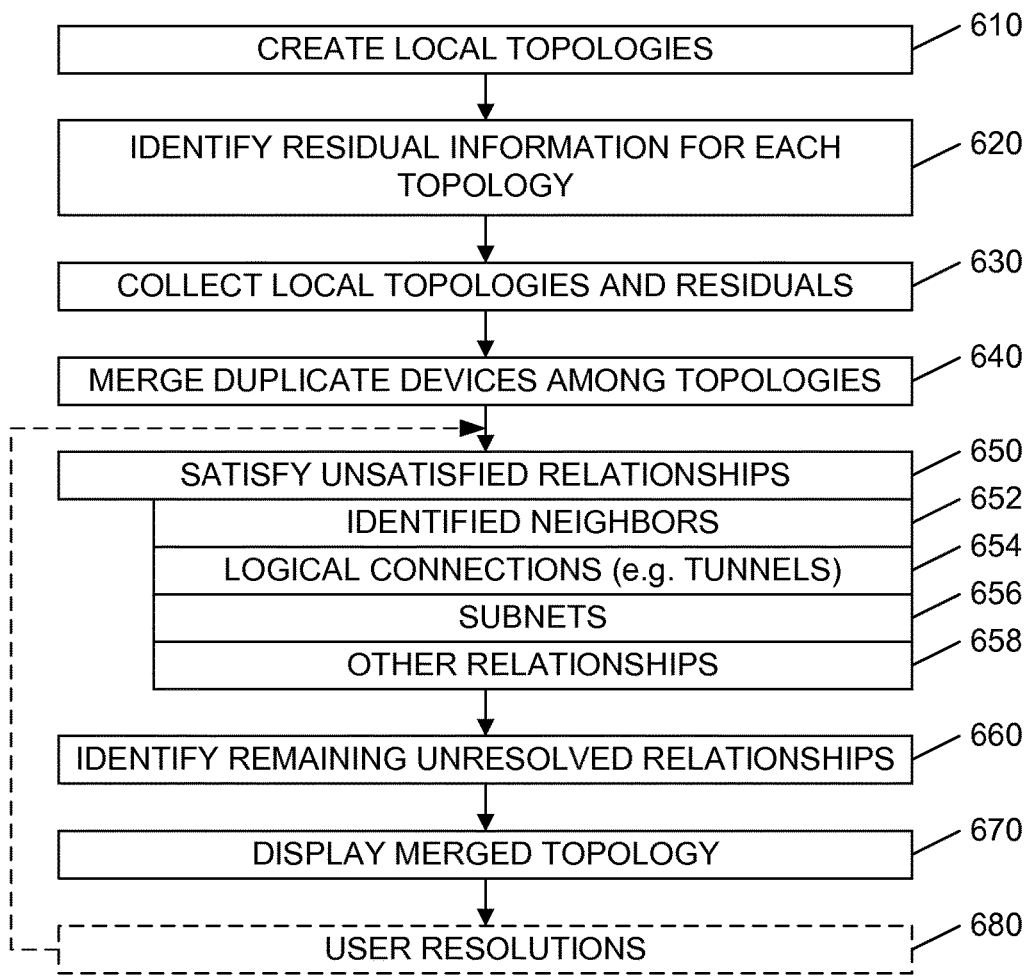
FIG. 6 illustrates an example flow diagram for stitching together a plurality of network topologies based on residual information associated with each network.

FIG. 6 illustrates an example flow diagram for stitching together a plurality of network topologies based on residual information associated with each network, and FIGS. 2A-2D, 3A-3C, 4A-4B, and 5 illustrate the application of the stitching processes to the individual networks illustrated in FIGS. 1A-1E.

At 610, a plurality of individual (local) topologies are determined, using any of a variety of topology inference tools, as detailed above. At 620, the residual information associated with each of the individual topologies is identified, the residual information being information that is not solely related to, or not known to be solely related to, devices and connections that are within each individual network. This information may be identified within the topology inference tool, via a post process, or via a combination of these techniques and others, as also detailed above.

One of skill in the art will recognize that any of a variety of techniques, both inclusive and exclusive, may be used to distinguish between information that appears to be solely related to devices or connections within an individual network from information that appears to be related to devices or connections that are external to the individual network. For example, in one embodiment, the residual information may include all of the configuration information provided to the topology inference tool except those information items that clearly/unequivocally reference only devices or connections that are within the network. In another embodiment, the residual information may include only the configuration information that clearly/unequivocally reference a device or connection that is external to the network. In a preferred embodiment, an approach that is between these extremes may be used, wherein, for example, information that is likely to assist in the identification of external devices and connections is included in the residual information, even if some of this information may be subsequently determined to be unrelated to external devices and connections.

At 630, the determined topologies and associated residual information is collected by the network stitching tool. The network stitching tool may be a component of one of the topology inference tools, or it may be a separately accessible tool.

As a first step 640 in the stitching process, duplicate identifications of elements (devices, connections, etc.) among the individual network topologies are merged. For example, the residual information of FIGS. 1D and 1E each include an identification of R30 (140) and R40 (150) being part of the same autonomous system AS123 (144, 154). Accordingly, this information can be used to create the topology of FIG. 2D, showing both devices R30 and R40 coupled to the autonomous system AS123, arbitrarily identified as element 144.

Figure 2A:
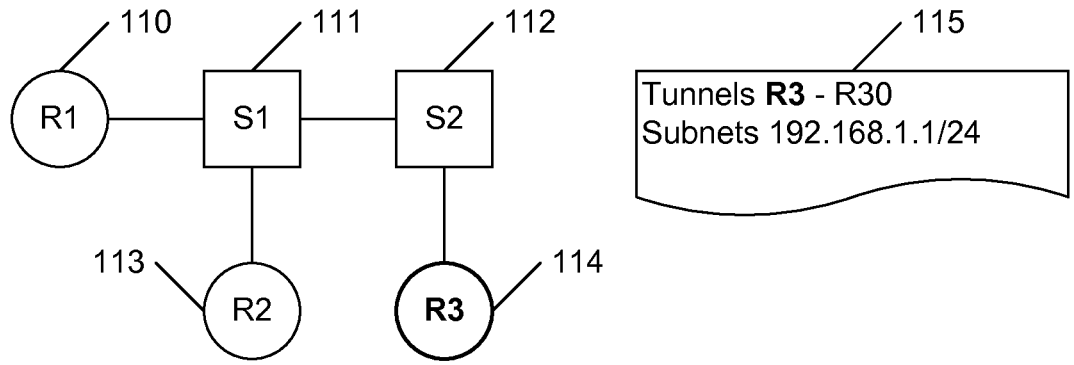
FIGS. 2A-2D illustrate the example set of FIGS. 1A-1E after merging of duplicate representations.
Figure 2B:
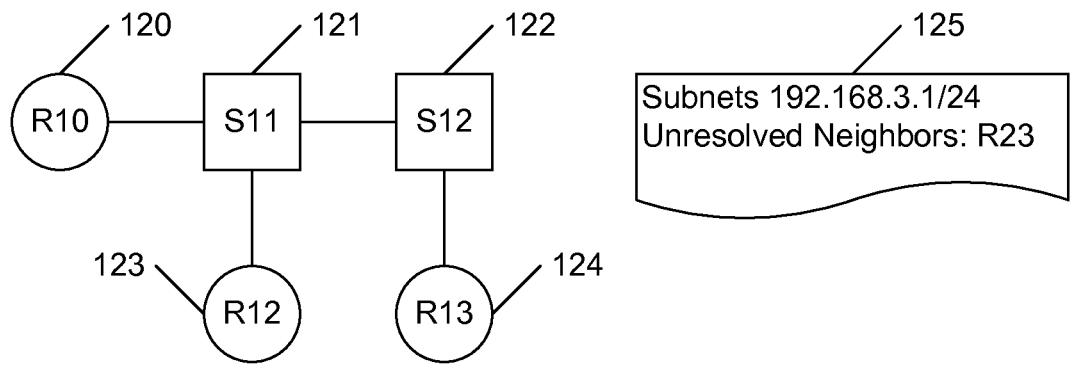
Figure 2C:
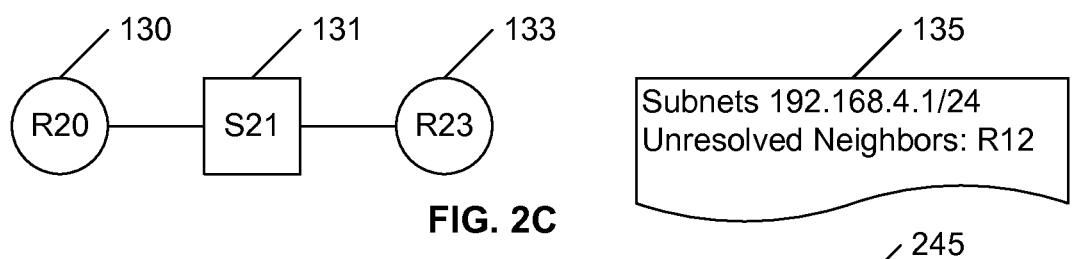
Figure 2D:
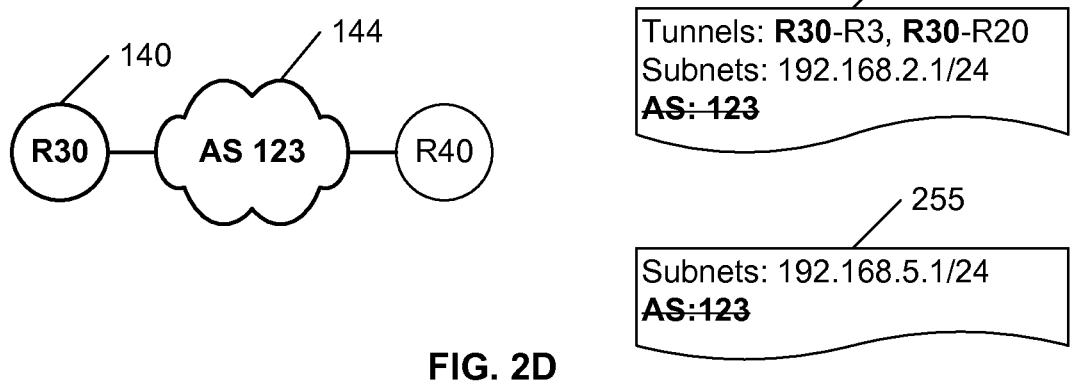
Figure 3A:
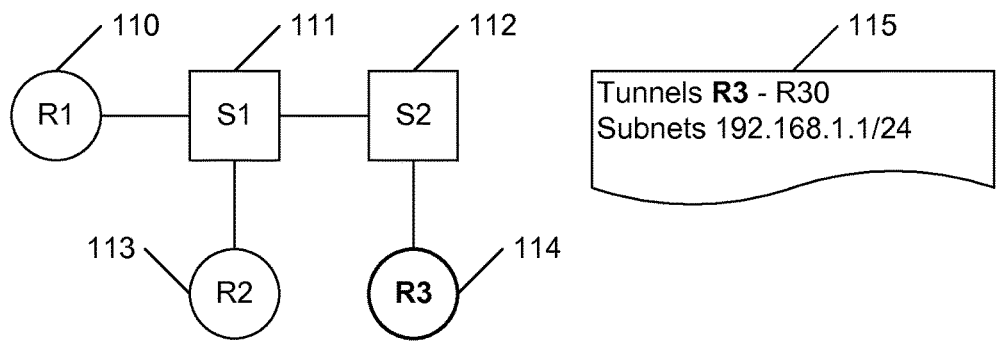
FIGS. 3A-3C illustrate the example set of FIGS. 2A-2D after resolving unresolved neighbors.

FIG. 2D also illustrates the elimination of AS123 from the residual information 245, 255 associated with the topology of FIG. 2D, in light of the fact that AS123 does not appear in the residual information of the other networks. If, in fact, AS123 had been included in the residual information of any other network, each of the other networks would have been merged with the topology of FIG. 2D. As illustrated in FIG. 3C, the residual information 245, 255 associated with FIG. 2D may be consolidated into a single set of residual information 345.

If there are any other duplicate elements in the residual data of the networks, the process 640 continues to merge these duplicates until all the duplicates have been merged.

After merging all known duplicates among the networks, the residual information is assessed at 650 in an attempt to satisfy unresolved relationships. This process 650 may include a variety of sub-processes, including a process 652 that assesses the presence of unresolved neighbors in each topology, a process 654 that assesses the presence of unresolved logical connections in each topology, a process 656 that assesses subnets, and other processes 658, as detailed below.

The residual information 125 of FIG. 2B identifies an unresolved neighbor of R12 as R23, and the residual information 135 of FIG. 2C identifies an unresolved neighbor of R23 as R12. Because R12 is in the topology of FIG. 2B, which has the unresolved neighbor R23, and R23 is in the topology of FIG. 2C, which has the unresolved neighbor R12, it is reasonable to assume/infer that the topologies of FIGS. 2B and 2C are coupled via these neighbors R12 and R23, as illustrated in FIG. 3B.

Figure 3B:
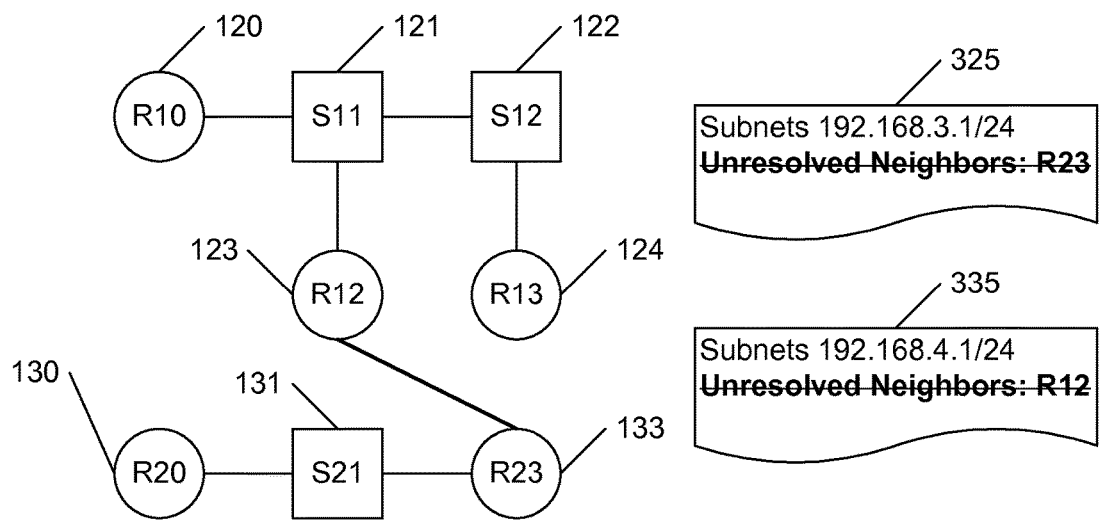
Figure 3C:
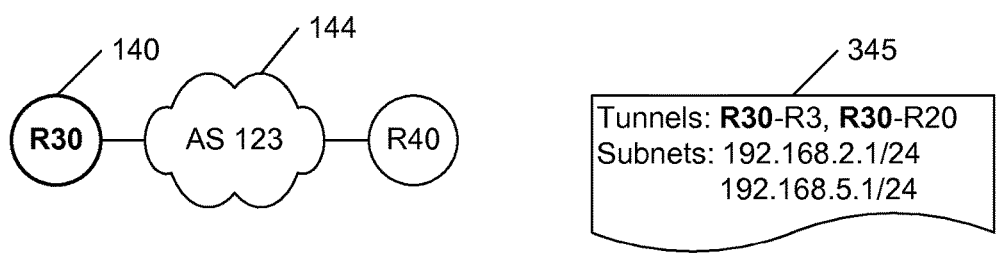

Having resolved the unresolved neighbors R12 and R23, these unresolved entries are removed from the residual information 325, 335 associated with the topology of FIG. 3B. These sets of residual information 325, 335 may be merged to form a single set of residual information 425 as illustrated in FIG. 4B.

If there are any other unresolved neighbors, the process 652 continues to attempt to resolve these neighbors until all of the unresolved neighbor information has been processed.

At 654, logical connections, such as the identification of tunnels, virtual private networks (VPNs), and the like are assessed to identify corresponding physical connections among the networks.

The residual information 115 of FIG. 3A indicates a tunnel between R3 and R30, and the residual information 345 of FIG. 3D illustrates a tunnel between R30 and R3 (as well as a tunnel between R30 and R20). Accordingly, it is reasonable to assume/infer that the topology of FIG. 3A may be connected to the topology of FIG. 3D via this tunnel between R3 and R30. Because R30 is connected to autonomous system AS123 and by inspecting the outgoing interface for R3 from R30, the connection between R3 and R30 may also be assumed/inferred to be via this autonomous system AS123, absent any information to the contrary. This connection is illustrated in FIG. 4A, which also indicates the deletion of these unresolved tunnel definitions in the residual data 415, 445 associated with FIG. 4A.

Because another logical connection, the tunnel between R30 and R20, remains in the residual information 445 of FIG. 4A, the process 654 continues in an attempt to find a physical connection corresponding to this logical connection.

Even though the residual information 425 associated with the network of FIG. 4B does not also include an identification of this tunnel between R20 and R30, the identification of a tunnel between R30 and R20 in the residual information 445 necessarily implies that a physical connection exists between R30 and R20. And, as noted above, because R30 is connected to autonomous system AS123 and by finding the outgoing interfaces from R20 to R30 and R30 to R20, it can be determined that the connection between R30 and R20 is via this autonomous system AS123, absent any evidence to the contrary.

This connection between R30 and R20 via AS123 is illustrated in FIG. 5, and the unresolved tunnel information is removed from the residual information 515 associated with the network of FIG. 5.

At 656, the residual information is assessed to determine whether devices are part of the same IP subnet.

In the example consolidated network of FIG. 5, the residual information includes only the set of independent IP subnets 192.168.(1, 2, 3, 4, 5).1/24. Because these subnets do not indicate any further connections among the elements of the topology of FIG. 5, no further processing is required, and the topology illustrated in FIG. 5 may be adopted as the topology of the entire network comprising each of the individual networks of FIGS. 1A-1E.

If, on the other hand, some of the devices identified in the IP subnets were in different individual networks, a connection among these devices in each subnet would be inferred if the existing connections are insufficient. In this assessment, care should be taken with regard to different local subnets having the same or overlapping local IP addresses. If the duplicates are caused by the use of Virtual Routing and Forwarding (VRF), the configuration data associated with the VRF is included in the residual data, and used to distinguish among these duplicates. If the duplicates are caused by the use of multiple subnets in the network with overlapping IP addresses, the user may be queried before each potential merging of such IP subnets.

At 658, any other unresolved relationships indicated in the residual information of any of the original or merged networks are assessed to determine connections among the devices of the assessed network.

At 660, any relationships that remain unresolved are identified, and the user is notified of a potentially incomplete network model.

It is significant to note that in the stitching together of the networks of FIG. 1A-1E, the details of the topologies of the individual networks were not involved. Instead, only the information related to potential external elements to each determined individual network, the 'residual information', was used by the network stitching tool to determine the connections between the individually determined networks.

At 660, the resultant merged network is presented to the user, typically via a graphic user interface that displays the topology of the merged network in graphic form. In the example embodiment, the connected network of FIG. 5 may be presented to the user as the consolidated topology of the networks of FIGS. 1A-1E.

At 680, if there are any remaining unresolved relationships, the user is given an opportunity to assess the remaining residual information, as well as other information, in an attempt to assist in the resolution process. Additionally, the user may be given the opportunity to override any incorrectly established resolutions.

If the user establishes or overrides the relationships, the system loops back to 650 to repeat the resolution process. Any user overrides are retained, and enforced during subsequent execution of the process of 650 (652-658).

Figure 7:
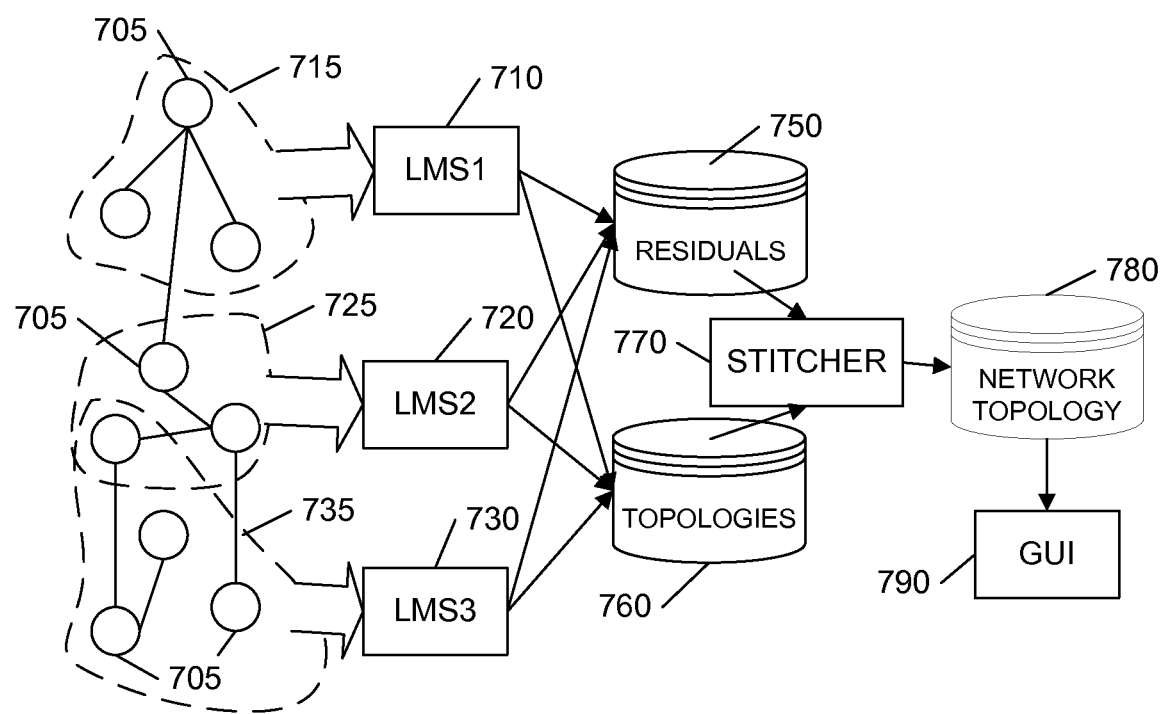
FIG. 7 illustrates an example block diagram of a network analysis system that includes a topology stitching tool Throughout the drawings, the same reference numerals indicate similar or corresponding features or functions. The drawings are included for illustrative purposes and are not intended to limit the scope of the invention.

FIG. 7 illustrates an example block diagram of a network analysis system that includes a topology stitching tool that determines/infers connections among networks based on residual information associated with each network.

In the example of FIG. 7, three local management systems LMS1 710, LMS2 720, and LMS3 730 are configured to monitor the devices 705 within defined individual networks 715, 725, 735, respectively. Each of these management systems 710, 720, 730 is configured to receive configuration and other information from the devices within its assigned individual network 715, 725, 735, and infer the corresponding topology of each of these individual networks.

In accordance with an aspect of this invention, each of the management systems 710, 720, 730 also filters the configuration information received from its devices to identify its residual information, corresponding to unsatisfied relationships, or potential relationships. In an example embodiment, each system 710, 720, 730 identifies and removes all of the information items that are ascertained to be related only to devices that are within their individual networks 715, 725, 735, leaving the information that cannot be ascertained to be related only to the devices within their individual networks 715, 725, 735 as the residual information.

A stitching tool 770 gathers the topologies of the individual networks 760 and the corresponding residual information 750 from each of the local network management systems 710, 720, 730. This stitching tool 770 may be included in one of the local systems 710, 720, 730, or it may be remote from these systems.

As detailed above, the stitching tool 770 attempts to satisfy the unsatisfied relationships that are identified in the residual information 750, and as each relationship is satisfied, creates the corresponding links to connect the identified devices in the individual topologies 760, to form a complete network topology 780.

When the stitching tool 770 is unable to satisfy any remaining relationships, a graphic user interface tool 790 provides the results of the stitching to a user. Typically, the user will be presented with a 'high level' overview of the connections between the individual networks 715, 725, 735, with an option to 'drill down' to obtain more detailed information. The high level overview may show, for example, an outline shape for each individual network, with lines between these outlines to illustrate that one or more connections exist between pairs of networks. At a next level, the particular devices that provide these connections ('border' devices) may be illustrated; and at a further level, all of the devices within the individual networks may be illustrated, similar to the illustration of the network of FIG. 5.

The user may also be provided with information related to any remaining unsatisfied relationships, and the GUI 790 may enable an interaction between the user and the stitching tool 770. If the user is able to identify a connection that satisfies an unsatisfied relationship, for example, the stitching tool 770 will apply that connection to the network topology 780. The stitching tool 770 may repeat the analysis of the other unsatisfied relationships to determine if this change to the network topology 780 enables the stitching tool 770 to satisfy other unsatisfied relationships.

As noted above, the stitching tool 770 need only process the residual information 750, and does not need to process any of the information that was ascertained by the local management systems 710, 720, 730 to be related solely to devices within each individual network 715, 725, 735. The stitching tool 770 need only determine connections between the border devices that are identified in the residual information 750, which is a substantially less time consuming than conventional processes that attempt to determine the topology 780 of the entire network by processing all of the information from all of the devices within the network directly.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the individual network management systems need not provide an exhaustive topology. The topology that an individual network management system provides may be limited to an identification of the border devices of the individual network that are assumed to be connected to one or more external devices. Although having an exhaustive topology of the individual network will likely allow for a more efficient filtering to eliminate information that is solely related to devices in the network, a less efficient filtering will not prevent the stitching tool from determining connections among the border devices identified in the topology of each individual network. In like manner, the determination of the residual information may be performed by a separate post-processor, independent of the individual network management systems. The individual network management systems may provide the determined topology as well as the original configuration data, and the post-processor may produce the residual information by filtering the configuration data to remove information items related solely to devices that are included within the determined topology. This post-processor may be included within the network analysis system that includes the stitcher that processes the residual information. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of a combination of hardware portions (e.g., including discrete and integrated electronic circuitry) and software portions (e.g., computer programming).
f) hardware portions may include a processor, and software portions may be stored on a non-transitory computer-readable medium, and may be configured to cause the processor to perform some or all of the functions of one or more of the disclosed elements;
g) hardware portions may be comprised of one or both of analog and digital portions;
h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A network analysis system that includes:
   a processor;
   a non-transitory computer-readable storage medium storing instructions that, when executed by the processor, cause the network analysis system to perform a method, comprising:
   storing residual information received from each of a plurality of networks, wherein each network has a distinct management system, wherein each network comprises one or more devices that are managed by the distinct management system, and wherein the residual information includes (1) filtered configuration information obtained by removing information items related solely to devices that are included within each network, and (2) unsatisfied relationships related to connections with other devices that are not within each network in the plurality of networks,
   satisfying each unsatisfied relationship based on the residual information from each network in the plurality of networks, wherein said satisfying comprises identifying (1) a physical connection between two networks in the plurality of networks, and/or (2) a logical connection between two networks in the plurality of networks; and
   creating a link, in a network topology model, between individual networks in the plurality of networks corresponding to each unsatisfied relationship that was satisfied.

2. The network analysis system of claim 1, including a graphic user interface (GUI) that enables a user to view one or more of the connections between the individual networks.

3. The network analysis system of claim 1, wherein the residual information include endpoints of a logical tunnel.

4. The network analysis system of claim 1, wherein the residual information include devices that peer with a common autonomous system.

5. The network analysis system of claim 1, wherein the residual information include an identified neighbor relationship.

6. The network analysis system of claim 1, wherein the residual information include devices that are on a common IP subnet.

7. The network analysis system of claim 1, wherein the residual information include devices that are part of the same switching domain.

8. The network analysis system of claim 1, wherein the residual information is progressively filtered by selectively removing information items related to the identified connections between the individual networks.

9. A non-transitory computer-readable medium that includes a program that, when executed by a processor, causes the processor to:
   store residual information received from each of a plurality of networks, wherein each network has a distinct management system, wherein each network comprises one or more devices that are managed by the distinct management system, and wherein the residual information includes (1) filtered configuration information obtained by removing information items related solely to devices that are included within each network, and (2) unsatisfied relationships related to connections with other devices that are not within each network in the plurality of networks;
   satisfy each unsatisfied relationship based on the residual information from each network in the plurality of networks, wherein said satisfying comprises identifying (1) a physical connection between two networks in the plurality of networks, and/or (2) a logical connection between two networks in the plurality of networks; and
   create a link, in a network topology model, between individual networks in the plurality of networks corresponding to each unsatisfied relationship that was satisfied.

10. The medium of claim 9, wherein the program causes the processor to present a graphic user interface (GUI) that enables a user to view one or more of the connections between the individual networks.

11. The medium of claim 9, wherein the program causes the processor to filter the configuration data by removing the information items related solely to devices that are included within each network.

12. The medium of claim 9, wherein the residual information include endpoints of a logical tunnel.

13. The medium of claim 9, wherein the residual information include devices that peer with a common autonomous system.

14. The medium of claim 9, wherein the residual information include an identified neighbor relationship.

15. The medium of claim 9, wherein the residual information include devices that are on a common IP subnet.

16. The medium of claim 9, wherein the residual information include devices that are part of the same switching domain.

17. The medium of claim 9, wherein the residual information is progressively filtered by selectively removing information items related to the identified connections between the individual networks.

18. A method comprising:
    storing residual information received from each of a plurality of networks, wherein each network has a distinct management system, wherein each network comprises one or more devices that are managed by the distinct management system, and wherein the residual information includes (1) filtered configuration information obtained by removing information items related solely to devices that are included within each network, and (2) unsatisfied relationships related to connections with other devices that are not within each network in the plurality of networks;
    satisfying each unsatisfied relationship based on the residual information from each network in the plurality of networks, wherein said satisfying comprises identifying (1) a physical connection between two networks in the plurality of networks, and/or (2) a logical connection between two networks in the plurality of networks; and
    creating a link, in a network topology model, between individual networks in the plurality of networks corresponding to each unsatisfied relationship that was satisfied.

19. The method of claim 18, wherein the method includes filtering the configuration data by removing the information items related solely to devices that are included within each network.

20. The method of claim 18, wherein the residual information include two or more of: endpoints of a logical tunnel, devices that peer with a common autonomous system, an identified neighbor relationship, devices that are on a common IP subnet, and devices that are part of the same switching domain.

21. The method of claim 18, wherein the method includes progressively filtering the residual information by selectively removing information items related to the identified connections between the individual networks.

* * * * *